(12) United States Patent
Nicholson et al.

(10) Patent No.: US 10,589,973 B2
(45) Date of Patent: Mar. 17, 2020

(54) FLEXIBLE FEEDING AND CLOSING MACHINE FOR HINGED CAPS

(71) Applicant: ATS Automation Tooling Systems Inc., Cambridge (CA)

(72) Inventors: Kenneth Wayne Nicholson, Kingston (CA); Philip David Munroe, Kingston (CA); Martin George Smith, Kingston (CA); Robert David Almas, Kingston (CA)

(73) Assignee: ATS Automation Tooling Systems Inc., Cambridge (CA)

( * ) Notice: Subject to any disclaimer, the term of this patent is extended or adjusted under 35 U.S.C. 154(b) by 498 days.

(21) Appl. No.: 15/031,856

(22) PCT Filed: Oct. 9, 2014

(86) PCT No.: PCT/CA2014/000737
§ 371 (c)(1),
(2) Date: Apr. 25, 2016

(87) PCT Pub. No.: WO2015/058277
PCT Pub. Date: Apr. 30, 2015

(65) Prior Publication Data
US 2016/0264388 A1   Sep. 15, 2016

Related U.S. Application Data

(60) Provisional application No. 61/895,534, filed on Oct. 25, 2013.

(51) Int. Cl.
*B67B 3/20* (2006.01)
*B25J 9/00* (2006.01)

(52) U.S. Cl.
CPC .............. *B67B 3/20* (2013.01); *B25J 9/0051* (2013.01); *B25J 9/0093* (2013.01)

(58) Field of Classification Search
CPC ......... B67B 3/20; B29C 45/42; B29C 45/006; B25J 9/0093
(Continued)

(56) References Cited

U.S. PATENT DOCUMENTS

| 3,886,421 A | 5/1975 | Hassan et al. |
| 3,904,945 A | 9/1975 | Hassan et al. |

(Continued)

FOREIGN PATENT DOCUMENTS

| CA | 2045600 C | 2/1996 |
| CN | 1275115 A | 11/2000 |

(Continued)

OTHER PUBLICATIONS

EP Supplementary Search Report for EP 14 85 5374 dated Sep. 21, 2016.

(Continued)

*Primary Examiner* — Robert F Long
*Assistant Examiner* — Xavier A Madison
(74) *Attorney, Agent, or Firm* — Borden Ladner Gervais LLP

(57) ABSTRACT

An automated device for producing a closed part, commencing with an open part having a cap joined with a hinge to a body, the device comprising: a tool having a guide surface defined in an operating plane substantially orthogonal to a hinge axis; a part gripper disposed on a computer numerically controlled shuttle, the part gripper operable to: select an open part from a stream of identical open parts; engage one of: the cap; and the body, on a start point on the guide surface; slide the open part, within the operating plane from the start point to a finish point on the guide surface, to rotate the cap about the hinge axis from an open position to a closed position relative to the body; and release the closed part from the part gripper at a release station.

20 Claims, 5 Drawing Sheets

(58) Field of Classification Search
USPC .......................................... 53/285; 29/527.1
See application file for complete search history.

(56) References Cited

U.S. PATENT DOCUMENTS

| | | | |
|---|---|---|---|
| 4,040,595 A | | 8/1977 | Tecco |
| 4,238,023 A | | 12/1980 | Millar et al. |
| 4,340,352 A | * | 7/1982 | Hayberg ............ B29C 37/0014 |
| | | | 249/58 |
| 4,522,581 A | | 6/1985 | Schad et al. |
| 4,604,704 A | | 8/1986 | Eaves et al. |
| 4,620,347 A | | 11/1986 | Stark et al. |
| 4,690,633 A | | 9/1987 | Schad et al. |
| 4,782,274 A | | 11/1988 | Teegarden et al. |
| 4,847,988 A | * | 7/1989 | Eitzinger ............ B65B 7/2807 |
| | | | 29/710 |
| 5,136,222 A | | 8/1992 | Yamamoto et al. |
| 5,473,975 A | | 12/1995 | Bruno et al. |
| 5,934,496 A | * | 8/1999 | Mogard ............ B65B 7/2878 |
| | | | 215/235 |
| 6,401,011 B1 | | 6/2002 | Hashimukai |
| 6,404,160 B2 | | 6/2002 | Sagasaki et al. |
| 6,625,866 B2 | | 9/2003 | Stone et al. |
| 6,856,854 B2 | | 2/2005 | Endo et al. |
| 6,885,909 B2 | | 4/2005 | Isohata |
| 6,917,837 B2 | | 7/2005 | Hashimoto et al. |
| 7,030,585 B2 | | 4/2006 | Iwashita et al. |
| 7,089,085 B2 | | 8/2006 | Kim |
| 7,180,253 B2 | | 2/2007 | Weinhofer et al. |
| 7,183,739 B2 | | 2/2007 | Iwashita et al. |
| 7,272,524 B2 | | 9/2007 | Brogaardh |
| 7,298,385 B2 | | 11/2007 | Kazi et al. |
| 7,385,370 B2 | | 6/2008 | Sekiguchi |
| 7,463,002 B2 | | 12/2008 | Tanaka |
| 7,525,274 B2 | | 4/2009 | Kazi et al. |
| 7,529,599 B1 | | 5/2009 | Bhatt et al. |
| 7,650,984 B2 | | 1/2010 | Giuliani et al. |
| 7,729,804 B2 | | 6/2010 | Matsumoto et al. |
| 7,729,910 B2 | | 6/2010 | Printz |
| 7,740,125 B2 | | 6/2010 | Dermarderosian et al. |
| 7,795,833 B2 | | 9/2010 | Sekiguchi |
| 8,000,818 B1 | | 8/2011 | Bhatt et al. |
| 8,005,563 B2 | | 8/2011 | Cobb et al. |
| 8,417,363 B2 | | 4/2013 | Erlandsson-Warvelin et al. |
| 8,977,394 B2 | | 3/2015 | Khoukhi et al. |
| 8,996,168 B2 | | 3/2015 | Murray, IV et al. |
| 9,776,330 B2 | | 10/2017 | Day et al. |
| 9,802,507 B2 | | 10/2017 | Clark et al. |
| 9,904,281 B2 | | 2/2018 | Nicholson et al. |
| 9,943,961 B2 | | 4/2018 | Nakazato et al. |
| 10,018,985 B2 | | 7/2018 | Nicholson et al. |
| 2004/0052891 A1 | | 3/2004 | Kalemba |
| 2004/0262127 A1 | | 12/2004 | Harnish et al. |
| 2005/0085359 A1 | | 4/2005 | Stave et al. |
| 2006/0085085 A1 | | 4/2006 | Duemler |
| 2007/0284216 A1 | | 12/2007 | Meier et al. |
| 2012/0221140 A1 | | 8/2012 | Berman et al. |
| 2015/0274436 A1 | * | 10/2015 | Di Donna ............ B65G 47/24 |
| | | | 414/751.1 |
| 2018/0118467 A1 | | 5/2018 | Gregory |

FOREIGN PATENT DOCUMENTS

| | | |
|---|---|---|
| CN | 1748286 A | 3/2006 |
| CN | 101578162 A | 11/2009 |
| DE | 60302920 T2 | 7/2006 |
| DE | 10314025 B4 | 4/2010 |
| EP | 0173818 A2 | 3/1986 |
| EP | 1353251 B1 | 12/2005 |
| EP | 1607194 B1 | 10/2008 |
| EP | 1221353 B1 | 1/2009 |
| EP | 1793292 B1 | 11/2009 |
| EP | 1455438 B1 | 12/2009 |
| EP | 1424613 B1 | 4/2010 |
| EP | 1705541 B1 | 7/2010 |
| EP | 1349027 B1 | 11/2010 |
| EP | 1349129 B1 | 11/2010 |
| EP | 1122036 B1 | 1/2011 |
| EP | 1462895 B1 | 4/2011 |
| EP | 1635995 B1 | 1/2012 |
| EP | 1942476 B1 | 12/2012 |
| EP | 2985113 B1 | 3/2018 |
| ES | 2187332 B1 | 10/2004 |
| GB | 1360441 A | 7/1974 |
| GB | 2225651 A | 6/1990 |
| JP | H042421 B2 | 1/1992 |
| WO | 82/02359 | 7/1982 |
| WO | 2009053432 A1 | 4/2009 |
| WO | 2014078938 A1 | 5/2014 |
| WO | 2015058277 A1 | 4/2015 |
| WO | 2016023101 A1 | 2/2016 |

OTHER PUBLICATIONS

Australian Patent Application No. AU2013350264, Examination Report dated Sep. 30, 2016.
Brazilian Patent Application No. BR112014004246.2, Office Action dated Jul. 3, 2017.
Brazilian Patent Application No. BR112014004257.8, Office Action dated Jun. 25, 2017.
Chinese Patent Application No. CN2013800611704, First Office Action dated Dec. 26, 2016—English Translation Available.
Chinese Patent Application No. CN2013800611704, Second Office Action dated Jul. 31, 2017—English Translation Available.
European Patent Application No. 13856718.5, Office Action dated Feb. 5, 2016.
European Patent Application No. 13856718.5, Supplementary European Search Report dated Dec. 21, 2015.
European Patent Application No. 15832329.5, Supplementary European Search Report dated Feb. 8, 2018.
International Patent Application No. PCT/CA2013/000974, International Preliminary Report on Patentability dated May 26, 2015.
International Patent Application No. PCT/CA2013/000974, International Search Report and Written Opinion dated Feb. 10, 2014.
International Patent Application No. PCT/CA2014/000737, International Preliminary Report on Patentability dated Apr. 26, 2016.
International Patent Application No. PCT/CA2014/000737, International Search Report and Written Opinion dated Dec. 30, 2014.
International Patent Application No. PCT/CA2015/000460, International Preliminary Report on Patentability dated Feb. 14, 2017.
International Patent Application No. PCT/CA2015/000460, International Search Report and Written Opinion dated Nov. 3, 2015.
Mexican Patent Application No. Mx/a/2015/006522, Office Action dated Feb. 13, 2017.
Singapore Application No. SG20151103884V, Supplementary Examination Report dated Sep. 4, 2015.
Sprovieri, J., Servos Revolutionize High-Speed Assembly, Jan. 8, 2014, Retrieved from the Internet: (https://www.assemblymag.com/articles/91810-servos-revolutionize-high-speed-assembly), Copyright ©2019, All Rights Reserved BNP Media.
Sprovieri., "XYZ: Electronic Camming Improves Pick-and-Place," Assembly Magazine, Mar. 2012, http://www.assemblymag.com/articles/print/89833 2 pages.
U.S. Appl. No. 15/503,104, Notice of Allowance dated Feb. 23, 2018.
U.S. Appl. No. 15/503,104, Notice of Allowance dated Jun. 13, 2018.
U.S. Appl. No. 14/087,419, Final Office Action dated Sep. 26, 2017.
U.S. Appl. No. 14/087,419, Non-Final Office Action dated Apr. 14, 2017.
U.S. Appl. No. 14/087,419, Non-Final Office Action dated Oct. 28, 2016.
U.S. Appl. No. 14/087,419, Notice of Allowance dated Dec. 21, 2017.
U.S. Appl. No. 14/087,419, Notice of Allowance dated Oct. 12, 2017.

(56) References Cited

OTHER PUBLICATIONS

Using Electronic Cams for Motion Control; Machine Design/Technologies; Motion System Design, Langnau, Leslie, Jul. 2000; http://machinedesign.com.
U.S. Provisional Appl. No. 61/782,758 filed on Mar. 14, 2013.
U.S. Provisional Appl. No. 61/729,480 filed on Nov. 23, 2012.
U.S. Provisional Appl. No. 62/036,305 filed on Aug. 12, 2014.
U.S. Appl. No. 15/903,244 filed on Feb. 23, 2018.
U.S. Provisional Appl. No. 62/746,823 filed on Oct. 24, 2018.
Japanese Patent Application No. 2017-527954, Office Action dated Aug. 21, 2019—English Translation available.
International Patent Application No. PCT/CA2019/051470, International Search Report and Written Opinion dated Dec. 12, 2019.
Brazilian Patent Application No. BR112015011856-9, Office Action dated Jan. 14, 2020.

* cited by examiner

FLEXIBLE FEEDING AND CLOSING MACHINE FOR HINGED CAPS

TECHNICAL FIELD

The invention relates to an automated machine for closing hinged caps of closures for bottle and containers.

BACKGROUND OF THE ART

The manufacture of closures for containers generally involves thermoplastic injection molding of the sealing cap hinged together with the annular bottle mouth or container closure body in a single open part.

When plastic bottles or containers are filled, the contents are usually sealed with a tamper evident film over the open end and a closure is attached to threads or a snap locking ridge on the bottle neck over the opening. The closure must first be closed before being feed to the filling and capping machine where the closure is attached to the bottle or container by turning or press fitting.

Injection molded plastic closures with hinged caps and closure bodies are shown in U.S. Pat. Nos. 7,322,493 and 7,731,042, for example, an need not be explained in detail herein.

In some instances, the process of stripping the plastic closures from the injection mold can include rotation of the hinged cap to a closed position on the closure body, as shown for example by www.onemold.com at http://www.youtube.com/watch?v=QSgoXar3Xzc&feature=player_detailpage. For various reasons this method of closing the cap is not applicable. In some cases there is a need to cool the closure before closing the cap to avoid damage due to material or to achieve optimal mold cycle time. Further where closure bodies include nozzles or valves of different plastic materials that are installed in the closure opening in a separate step, the cap must be closed after the nozzle or valve is installed.

To close the hinged cap on the closure body specialized carousel machines are commonly used where random oriented closures are singulated in a stream of parts, then the open closures are placed from the stream into a socket in a rotating carousel, the cap is engaged with a cam or rail to rotate to a closed position, the partially closed part is transferred to another carousel with press closing tools, and compression is applied to snap the cap closed. For example see http://www.youtube.com/watch?feature=player_detail page&v=yk GerA-zi0A.

However the conventional machinery for closing hinged caps is limited to a narrow range of sizes and shapes that can be efficiently handled. In general if a different sized closure or cap is required, the singulation, closing and compressing machinery must be modified to suit each closure. A different size or shape requires replacement of the machine parts that engage and hold the closure which involves significant expense and downtime. For this reason, closures of standard sizes and shapes are generally used to provide economies of scale in mass production. Colours can be modified by changing the plastic used for molding, however little other modification to the standard closure design is possible without extensive modification to the machinery that singulates, conveys and closes the cap on the closure body. Large quantities of identical closures are manufactured and used by packaging operators because the cost of changing the size and shape of closures is prohibitive. Smaller operators cannot compete due to the large capital costs involved. Closure designs are restricted to those standard shapes and sizes that can be manufactured and purchased at low cost.

It is desirable to provide flexibility in closure designs by allowing changes without requiring the handling, feeding and closing machinery to be extensively modified. Further it is desirable to allow packaging operators to adapt machinery rapidly so that smaller runs and custom closures can be accommodated without prohibitive costs.

Features that distinguish the present invention from the background art will be apparent from review of the disclosure, drawings and description of the invention presented below.

DISCLOSURE OF THE INVENTION

The invention provides an automated device for producing a closed part, commencing with an open part having a cap joined with a hinge to a body, the device comprising: a tool having a guide surface defined in an operating plane substantially orthogonal to a hinge axis; a part gripper disposed on a computer numerically controlled shuttle, the part gripper operable to: select an open part from a stream of identical open parts; engage one of: the cap; and the body, on a start point on the guide surface; slide the open part, within the operating plane from the start point to a finish point on the guide surface, to rotate the cap about the hinge axis from an open position to a closed position relative to the body; and release the closed part from the part gripper at a release station.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 5:
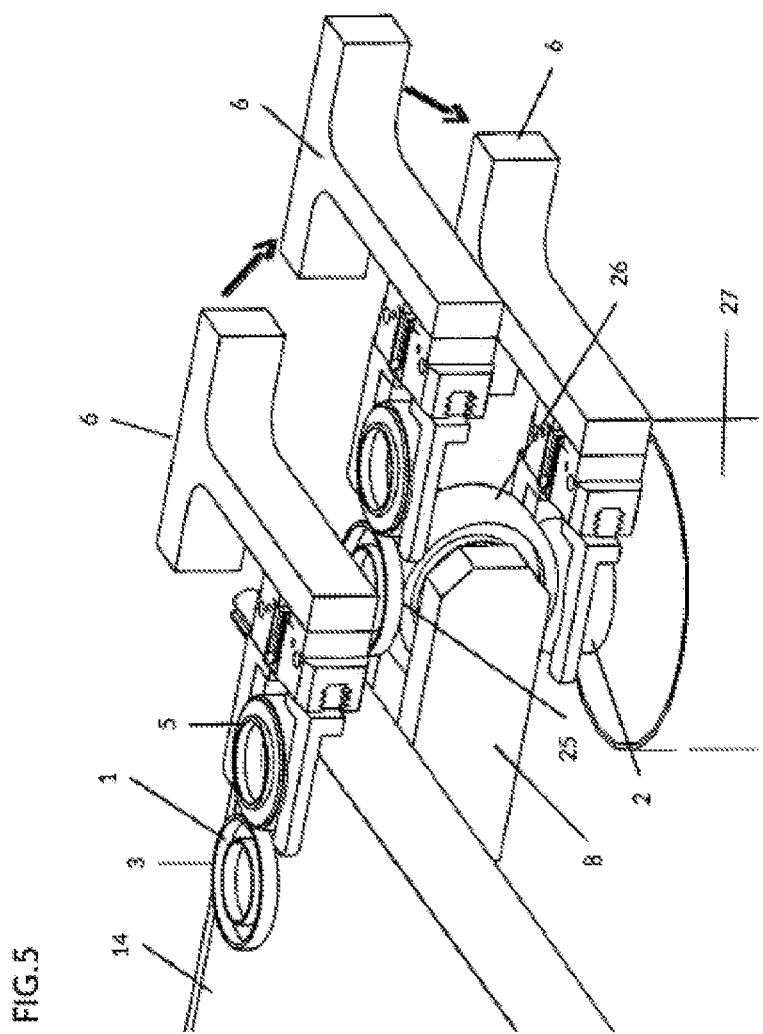
FIG. 5 is a detail view like FIG. 4 showing the movement of the part gripper around the roller tool where the upper position shows gripping of an open part from the feed conveyor, the middle position shows the engagement of the hinged cap with a top portion of the roller and the lower position shows the closing of the cap against the closure body.

The purpose of the automated device is to take an open part 1 and produce a closed part 2 (see FIG. 5). The use of computer numerically controlled robots and actuators allows the automated device to be rapidly adapted to different sizes and shapes of closures, mainly through computer programming parameter selections and modifying the mechanical part grippers on the ends of the robots if necessary.

Figure 4:
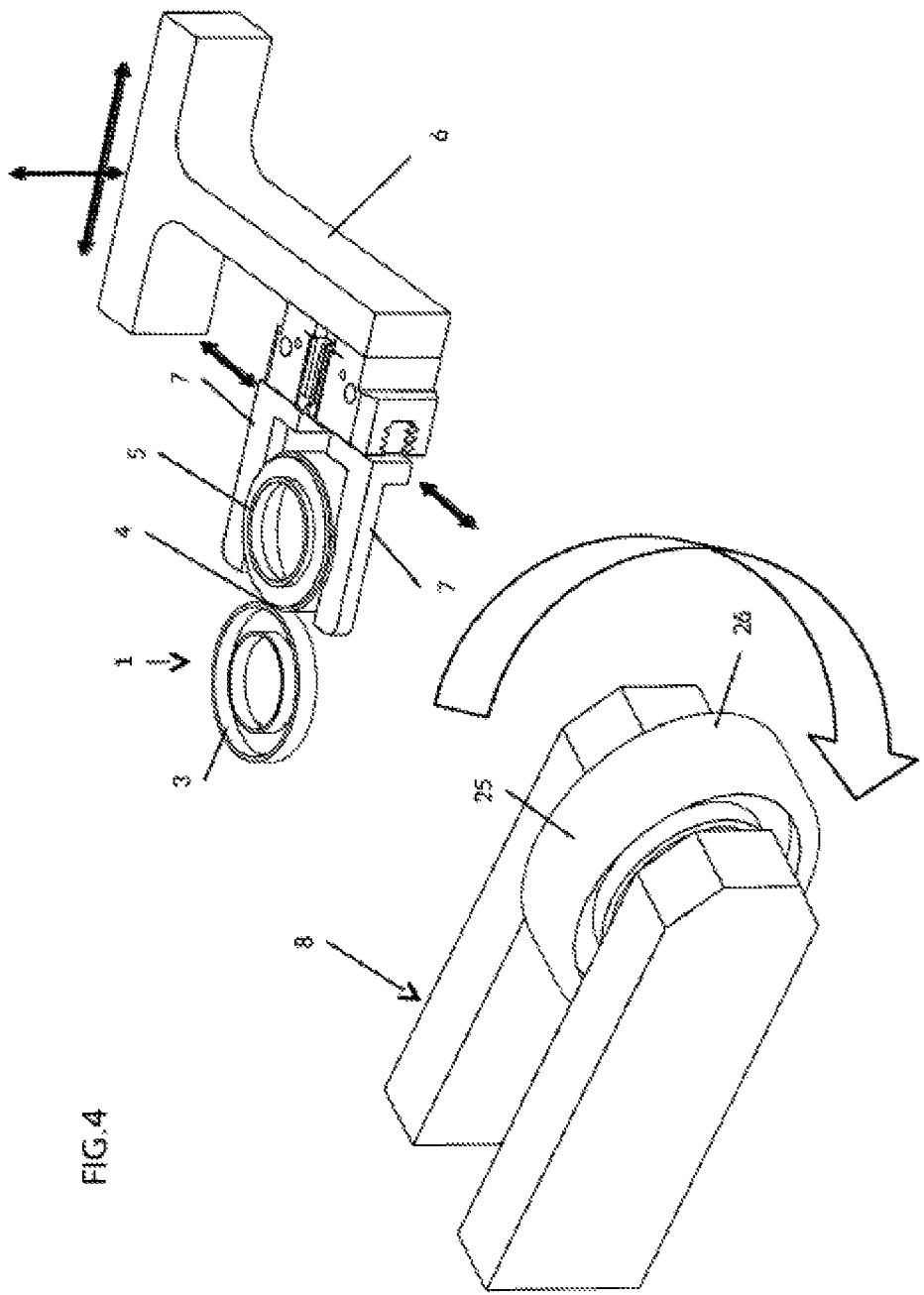
FIG. 4 is a detail view of the part gripper and the closing tool, being an idler roller that engages the hinged cap as the gripper is moved around the roller by the X-Z shuttle.

In the example illustrated, a conventional bottle end closure is the open part 1 shown in FIG. 4, having a cap 3 joined with a hinge 4 to an annular body 5. The part gripper 6 includes horizontally actuated fingers 7 to hold the body 5 but equally could be adapted to hold the cap 3 in an orientation rotated 180°. As noted above, to accommodate different sized or shaped open parts 1, the fingers 7 can be easily removed and replaced if necessary. However in many cases the open parts 1 are circular and a variation in size can be accomplished by simply changing the spacing between the fingers 7. As indicated with arrows, the fingers 7 open and close, and the part gripper 6 is moved up-down and left-right with linear actuators to follow around the tool 8. As shown in FIG. 5, the movement of the part gripper 6 around the tool 8 results in closing of the hinged cap 3 to the body 4, which will be described in more detail below.

Figure 1:
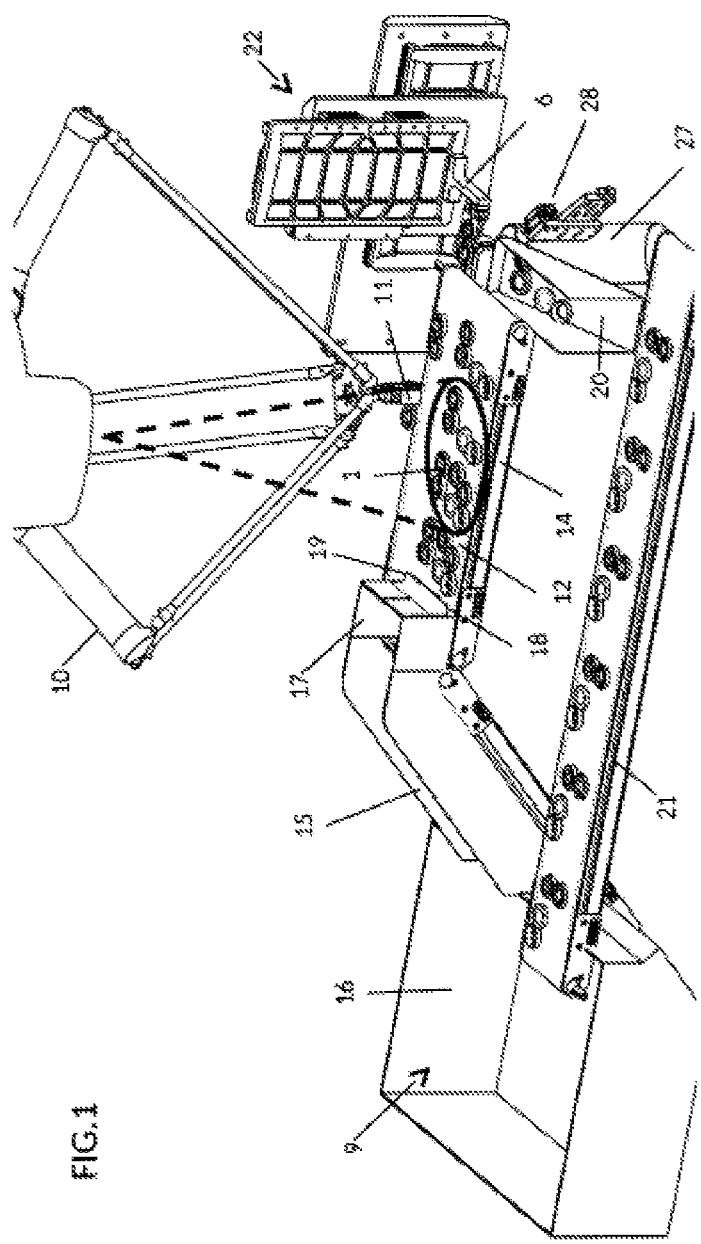
FIG. 1 is an isometric view of an automated device for receiving open parts, being bottle closures with a disc cap hinged to an annular body, and showing the overhead feed manipulator pick and place robot with optical scanner arranging open parts on the feed conveyor.

With reference to FIG. 1, the feeding of open parts 1 to the part gripper 6 is illustrated to supply the automated device and produce a closed part 2. The feeding sequence commences with identical open parts 1 deposited in random bulk orientation into the loading hopper 9 through an intake opening 16 for receiving randomly oriented open parts 1. A feed manipulator 10 is illustrated as an overhead parallel motion robot with optical scanning capability shown with conical dashed lines, also sometimes known as a pick-and-place robot. The feed manipulator 10 has an end effector 11 with gripping fingers and a rotary mount for picking and rotating the open parts 1. The feed manipulator 10 is programmed to automatically scan the open parts 1 on the feed conveyor 14 and then select open parts that are closest to the required position and orientation for placement in the stream which is fed toward the part gripper 6.

Figure 2:
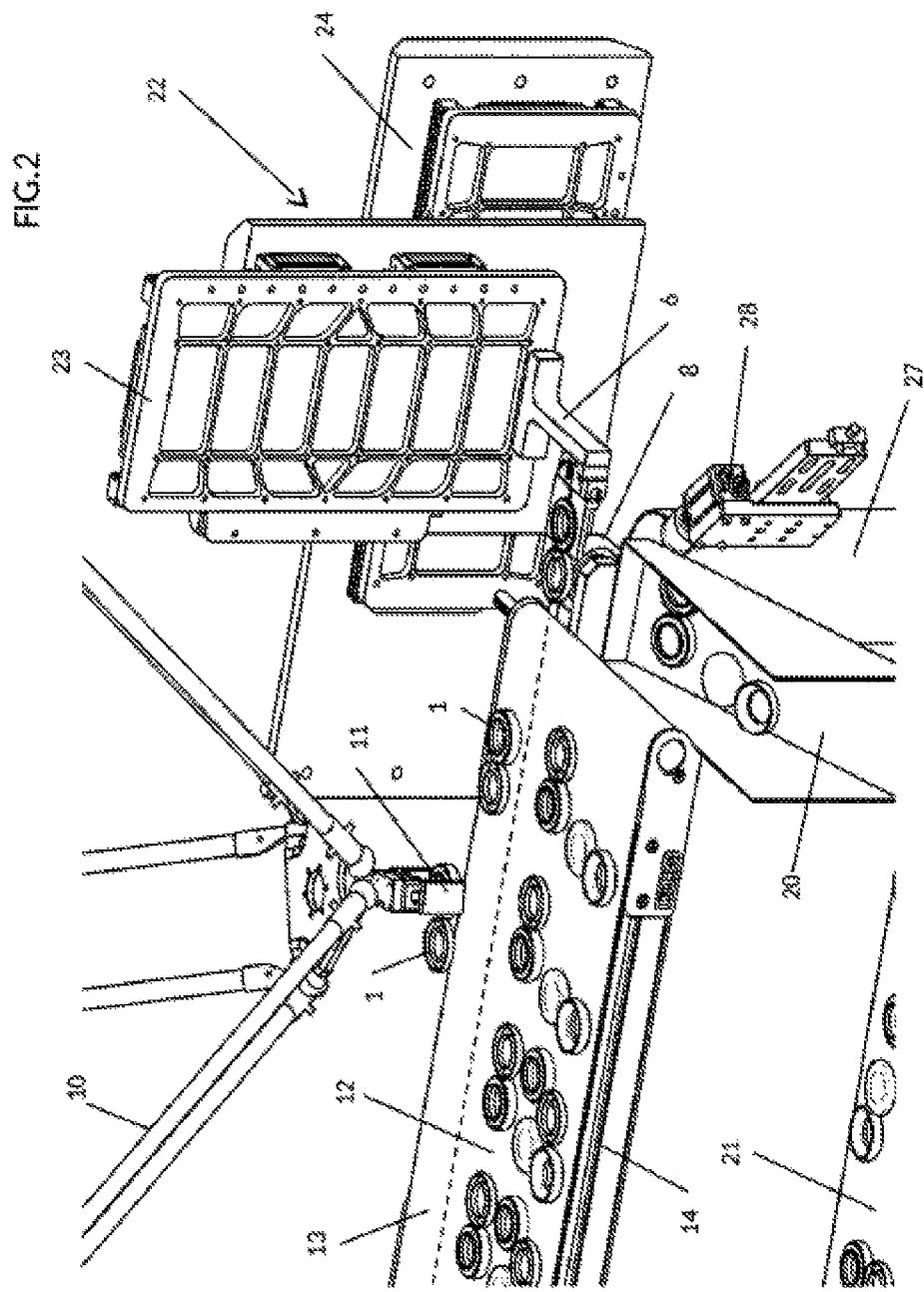
FIG. 2 is a detail view of a portion of FIG. 1 showing the feed conveyor that conveys oriented open parts toward the part gripper disposed on a two linear motion actuators that form an X-Z axis computer numerically controlled shuttle.

As better seen in FIG. 2 with a dashed line, the feed manipulator 10 picks open parts 1 from a first portion 12 of the feed conveyor 14 and places open parts 1 spaced apart into a conveyed stream of open parts 1 on a second portion 13 of the feed conveyor 14 in the selected orientation, namely with the annular body 5 towards the part gripper 6 in the example illustrated.

As seen in FIG. 1, the loading hopper 9 includes an inclined conveyor 15 and a pre-sorting hopper 17. The pre-sorting hopper 17 has an outlet opening 18 at it's bottom for dropping open parts 1 onto the first portion 12 of the feed conveyor 14 in an open flat position. The open parts 1 at this point may be right side up, up side down and in any angular orientation relative to the feed direction of the feed conveyor 14. The outlet opening 18 of the pre-sorting hopper 17 hopper includes a dispensing blade 19 disposed a selected distance from the first portion 12 of the feed conveyor 14. The selected distance is greater than the height and less than the width of the open parts 1, to arrange the open parts 1 laying flat on the feed conveyor 14. Any unintentionally closed parts will be retained in the pre-sorting hopper 17 to be periodically removed by an operator. Any open parts 1 that land on their sides in the pre-sorting hopper 17 will be jumbled around by the motion of the feed conveyor 14 until they are oriented flat and can pass through the outlet opening 18.

FIGS. 1 and 2 show the end of the first portion 12 of the feed conveyor 14 disposed above a return chute 20 of a return conveyor 21 to recirculate non-selected open parts 1 back to the loading hopper 9.

Figure 3:
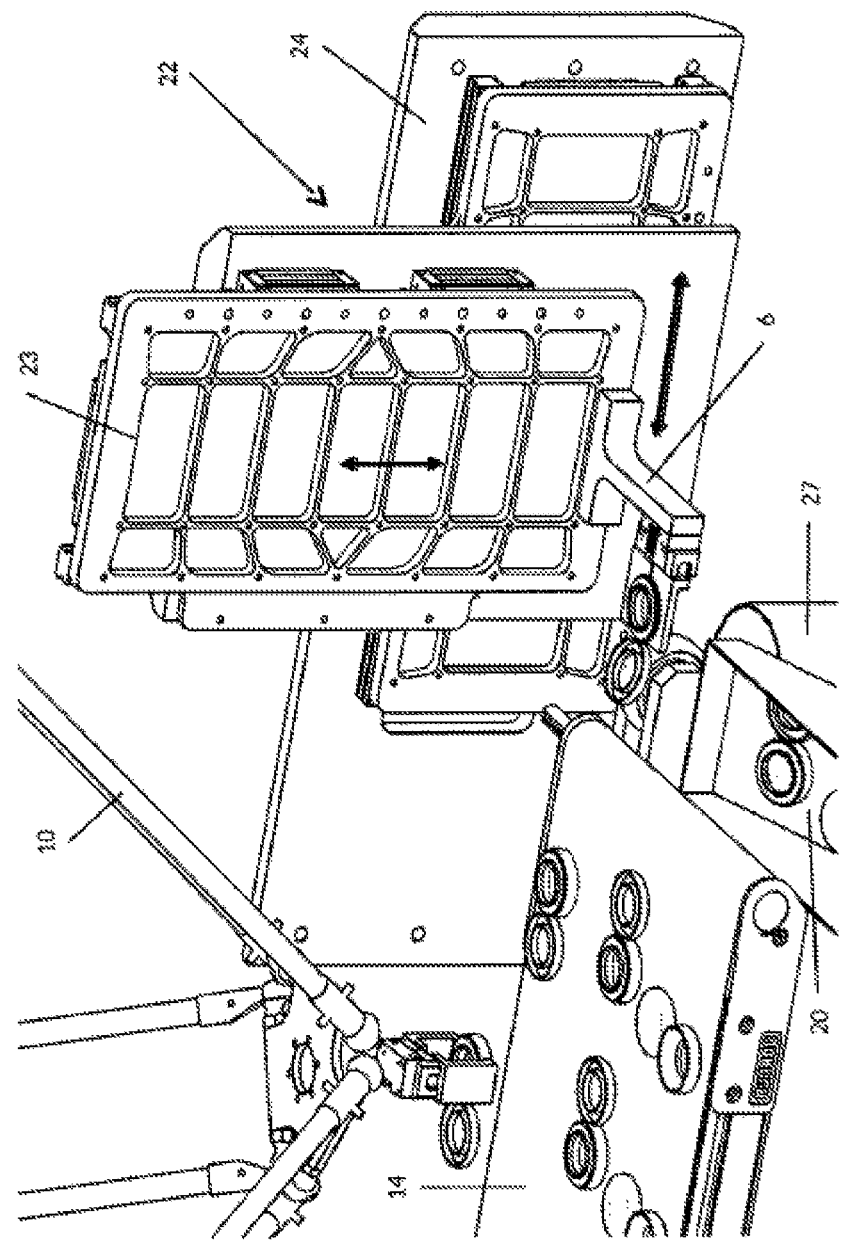
FIG. 3 is a detail view like FIG. 2 showing the initial contact of the hinged cap with the closing tool while the body is held in the part gripper and the shuttle moves the gripper around the closing tool.

Recapping the closing method with reference to FIGS. 2 and 3, the part gripper 6 is disposed on a computer numerically controlled shuttle 22 having at least two linear motion actuators 23, 24 disposed orthogonally and each having a linear operating path parallel to the operating plane of the tool 8 and the part gripper 6. The two linear motion actuators 23, 24 are independently programmable to drive the part gripper 6 along a selected path within the operating plane In the illustrated example, the vertical actuator 23 moves the part gripper 6 up and down, and the horizontal actuator 24 moves the part gripper 6 toward and away from the feed conveyor 14. Of course a third actuator (not shown) could also be included if necessary to move transverse to the feed conveyor direction to produce a three dimensional Cartesian coordinate robot. In the present example a two dimensional shuttle 22 is sufficient for the purpose. The part gripper 6 mounted on the shuttle 22 is operable to select an open part 1 from a stream of identical open parts 1 on the feed conveyor 14.

FIGS. 4 and 5 show a tool 8 that comprises a roller 26 mounted for rotation about a roller axis that is parallel to the hinge axis of the hinge 4. As is apparent in FIG. 5, the circumferential surface 25 of the roller 26 provides a low friction guide surface to engage the cap 3 during movement of the part gripper 6 in the operating plane which is defined substantially orthogonal to a hinge axis. The roller 26 as illustrated is a freely rotating idler roller but could also be driven or rotation may be controlled for various applications if required. The tool 8 can also be configured as a flat plate or a spherical resilient ball.

As seen in FIG. 5, the part gripper 6 removes the open part 1 from the feed conveyor 14 and moves toward the tool 8 to engage the cap 3 on an upper start point on the roller guide surface 25. As noted above, alternatively the cap 3 can be gripped and the body 5 can engage the roller guide surface 25. The part gripper 6 slides the open part 1 within the operating plane from the upper start point to a lower finish point on the guide surface 25. As a result the cap 3 rotates about the hinge axis from an open position to a closed position relative to the body 5.

The closed part 2 is then released from the part gripper at a release station above a completed part conveyor 27 for further assembly to a container. The release station can include an optical scanner 28 as seen in FIGS. 1 and 2 in communication with a deflector or air jet for directing towards the completed part conveyor 27 and a reject part conveyor.

Although the above description relates to a specific preferred embodiment as presently contemplated by the inventor, it will be understood that the invention in its broad aspect includes mechanical and functional equivalents of the elements described herein.

We claim:

1. An automated device for producing a closed part, commencing with an open part having a cap joined with a hinge to a body, the device comprising:
   a tool having a guide surface defined in an operating plane substantially orthogonal to a hinge axis;
   a part gripper disposed on a computer numerically controlled shuttle, the part gripper operable to:
      select an open part from a stream of identical open parts;
      engage one of: the cap; and the body, on a start point on the guide surface;
      slide the open part, within the operating plane from the start point to a finish point on the guide surface, to rotate the cap about the hinge axis from an open position to a closed position relative to the body; and release the closed part from the part gripper at a release station;

wherein the computer numerically controlled shuttle comprises at least two linear motion actuators disposed orthogonally and each having a linear operating path parallel to the operating plane; and wherein the at least two linear motion actuators are independently programmable to drive the part gripper along a selected path within the operating plane.

2. The automated device according to claim 1, wherein the tool comprises a roller mounted for rotation about a roller axis parallel to the hinge axis and having a circumferential guide surface.

3. The automated device according to claim 2, wherein the roller comprises a freely rotating idler roller.

4. The automated device according to claim 1, comprising:

a feed conveyor on which the stream of open parts is disposed in a selected orientation.

5. The automated device according to claim 4, comprising:

a feed manipulator having an end effector for picking open parts from a first portion of the feed conveyor and placing open parts spaced apart into said stream of open parts on a second portion of the feed conveyor in the selected orientation.

6. The automated device according to claim 5, wherein the feed manipulator comprises an overhead parallel motion robot with optical scanning capability.

7. The automated device according to claim 5, comprising:

a loading hopper having an intake opening for receiving randomly oriented open parts and an outlet opening for loading open parts on the second portion of the feed conveyor.

8. The automated device according to claim 7, wherein the outlet opening of the loading hopper includes a dispensing blade disposed a selected distance from the second portion of the feed conveyor, the selected distance being greater than a height and less than a width of the open parts.

9. The automated device according to claim 7, wherein an end portion of the feed conveyor is disposed above a return conveyor to recirculate open parts back to the loading hopper.

10. The automated device according to claim 1, wherein the release station includes an optical scanner in communication with a deflector for directing towards a completed part conveyor and a reject part conveyor.

11. An automated device for producing a closed part, commencing with an open part having a cap joined with a hinge to a body, the device comprising:

a tool having a guide surface defined in an operating plane substantially orthogonal to a hinge axis;

a part gripper disposed on a computer numerically controlled shuttle, the part gripper operable to:

select an open part from a stream of identical open parts;

engage one of: the cap; and the body, on a start point on the guide surface;

slide the open part, within the operating plane from the start point to a finish point on the guide surface, to rotate the cap about the hinge axis from an open position to a closed position relative to the body; and release the closed part from the part gripper at a release station;

a feed conveyor on which the stream of open parts is disposed in a selected orientation;

a feed manipulator having an end effector for picking open parts from a first portion of the feed conveyor and placing open parts spaced apart into said stream of open parts on a second portion of the feed conveyor in the selected orientation; and a loading hopper having an intake opening for receiving randomly oriented open parts and an outlet opening for loading open parts on the second portion of the feed conveyor;

wherein the outlet opening of the loading hopper includes a dispensing blade disposed a selected distance from the second portion of the feed conveyor, the selected distance being greater than a height and less than a width of the open parts.

12. The automated device according to claim 11, wherein the tool comprises a roller mounted for rotation about a roller axis parallel to the hinge axis and having a circumferential guide surface.

13. The automated device according to claim 12, wherein the roller comprises a freely rotating idler roller.

14. The automated device according to claim 11, wherein the feed manipulator comprises an overhead parallel motion robot with optical scanning capability.

15. The automated device according to claim 11, wherein the release station includes an optical scanner in communication with a deflector for directing towards a completed part conveyor and a reject part conveyor.

16. An automated device for producing a closed part, commencing with an open part having a cap joined with a hinge to a body, the device comprising:

a tool having a guide surface defined in an operating plane substantially orthogonal to a hinge axis;

a part gripper disposed on a computer numerically controlled shuttle, the part gripper operable to:

select an open part from a stream of identical open parts;

engage one of: the cap; and the body, on a start point on the guide surface;

slide the open part, within the operating plane from the start point to a finish point on the guide surface, to rotate the cap about the hinge axis from an open position to a closed position relative to the body; and release the closed part from the part gripper at a release station;

a feed conveyor on which the stream of open parts is disposed in a selected orientation;

a feed manipulator having an end effector for picking open parts from a first portion of the feed conveyor and placing open parts spaced apart into said stream of open parts on a second portion of the feed conveyor in the selected orientation; and a loading hopper having an intake opening for receiving randomly oriented open parts and an outlet opening for loading open parts on the second portion of the feed conveyor;

wherein an end portion of the feed conveyor is disposed above a return conveyor to recirculate open parts back to the loading hopper.

17. The automated device according to claim 16, wherein the tool comprises a roller mounted for rotation about a roller axis parallel to the hinge axis and having a circumferential guide surface.

18. The automated device according to claim 17, wherein the roller comprises a freely rotating idler roller.

19. The automated device according to claim 16, wherein the feed manipulator comprises an overhead parallel motion robot with optical scanning capability.

20. The automated device according to claim 16, wherein the release station includes an optical scanner in communication with a deflector for directing towards a completed part conveyor and a reject part conveyor.

* * * * *